United States Patent
Gervais et al.

(10) Patent No.: US 9,609,803 B2
(45) Date of Patent: Apr. 4, 2017

(54) AGRICULTURAL PRODUCT APPLICATION IN OVERLAP AREAS

(71) Applicant: CNH Industrial Canada Ltd., Saskatoon, Saskatchewan (CA)

(72) Inventors: Joel Gervais, Saskatoon (CA); James Henry, Saskatoon (CA)

(73) Assignee: CNH Industrial Canada, Ltd., Saskatoon, Saskatchewan (CA)

( * ) Notice: Subject to any disclaimer, the term of this patent is extended or adjusted under 35 U.S.C. 154(b) by 117 days.

(21) Appl. No.: 14/563,533

(22) Filed: Dec. 8, 2014

(65) Prior Publication Data

US 2016/0157420 A1    Jun. 9, 2016

(51) Int. Cl.
| | |
|---|---|
| *A01C 21/00* | (2006.01) |
| *A01C 7/18* | (2006.01) |
| *A01C 7/10* | (2006.01) |
| *G05B 15/02* | (2006.01) |
| *A01C 7/08* | (2006.01) |

(52) U.S. Cl.
CPC ............ *A01C 7/102* (2013.01); *A01C 21/005* (2013.01); *G05B 15/02* (2013.01); *A01C 7/081* (2013.01)

(58) Field of Classification Search
CPC ....... A01C 7/102; A01C 7/081; A01C 21/005; G05B 15/02
USPC ...................... 111/200, 14; 701/50
See application file for complete search history.

(56) References Cited

U.S. PATENT DOCUMENTS

| | | | |
|---|---|---|---|
| 5,913,915 A * | 6/1999 | McQuinn ............ | A01B 79/005 700/231 |
| 6,386,128 B1 | 5/2002 | Svoboda et al. | |
| 6,516,271 B2 | 2/2003 | Upadhyaya et al. | |
| 6,708,080 B2 | 3/2004 | Benneweis | |
| 6,997,120 B2 | 2/2006 | Gabriel | |
| 7,395,769 B2 * | 7/2008 | Jensen ..................... | A01C 7/00 111/121 |
| 7,555,990 B2 | 7/2009 | Beaujot | |
| 8,186,288 B2 | 5/2012 | Chinkiwsky | |
| 8,234,988 B2 | 8/2012 | Zielke et al. | |
| 8,307,771 B2 | 11/2012 | Cannon et al. | |
| 8,371,238 B2 | 2/2013 | Dean et al. | |
| 8,578,870 B2 * | 11/2013 | Beaujot ................. | A01C 7/088 111/200 |
| 9,237,687 B2 * | 1/2016 | Sauder ................... | A01C 5/064 |
| 2011/0054743 A1 * | 3/2011 | Kocer ................. | A01B 79/005 701/50 |

(Continued)

FOREIGN PATENT DOCUMENTS

| | | |
|---|---|---|
| CA | 2685239 A1 | 5/2011 |
| WO | 2012115563 A1 | 8/2012 |

OTHER PUBLICATIONS

Wheat Planting Pattern Study; Ebelhar; Dec. 1999.*

(Continued)

*Primary Examiner* — John G Weiss

(74) *Attorney, Agent, or Firm* — Rebecca L. Henkel; Richard K. DeMille

(57) ABSTRACT

By varying the agricultural product application rates when a product delivery system travels through predetermined overlap areas, the drawbacks of over seeding such overlap areas may be substantially reduced. As a result, a product delivery system may travel without stopping meter sections and without dragging a seeding tool through a completely seeded region.

20 Claims, 5 Drawing Sheets

(56) References Cited

U.S. PATENT DOCUMENTS

2012/0037057 A1 2/2012 Beaujot
2013/0124055 A1* 5/2013 Baurer .................. H04L 5/001
 701/50

OTHER PUBLICATIONS

Checkerboard Beans; Peterson; Jan. 2001.*
caseih.com; Website: http://www.caseih.com/en_us/AFS/Pages/Section-Rate-Control.aspx; Section & Rate Control; May 9, 2012.
seedhawk.com; Website: http://www.seedhawk.com/Products/SCT/Sectional-Control-Technology/; Sectional Control Technology; 2013.
agleader,com; Website: http://www.agleader.com/products/seedcommand/; SeedControl; 2013.
dickey-john.com; Website: http://www.dickey-john.com/save/; Seed Control the Reduces Planting Overlap; Mar. 27, 2011.

* cited by examiner

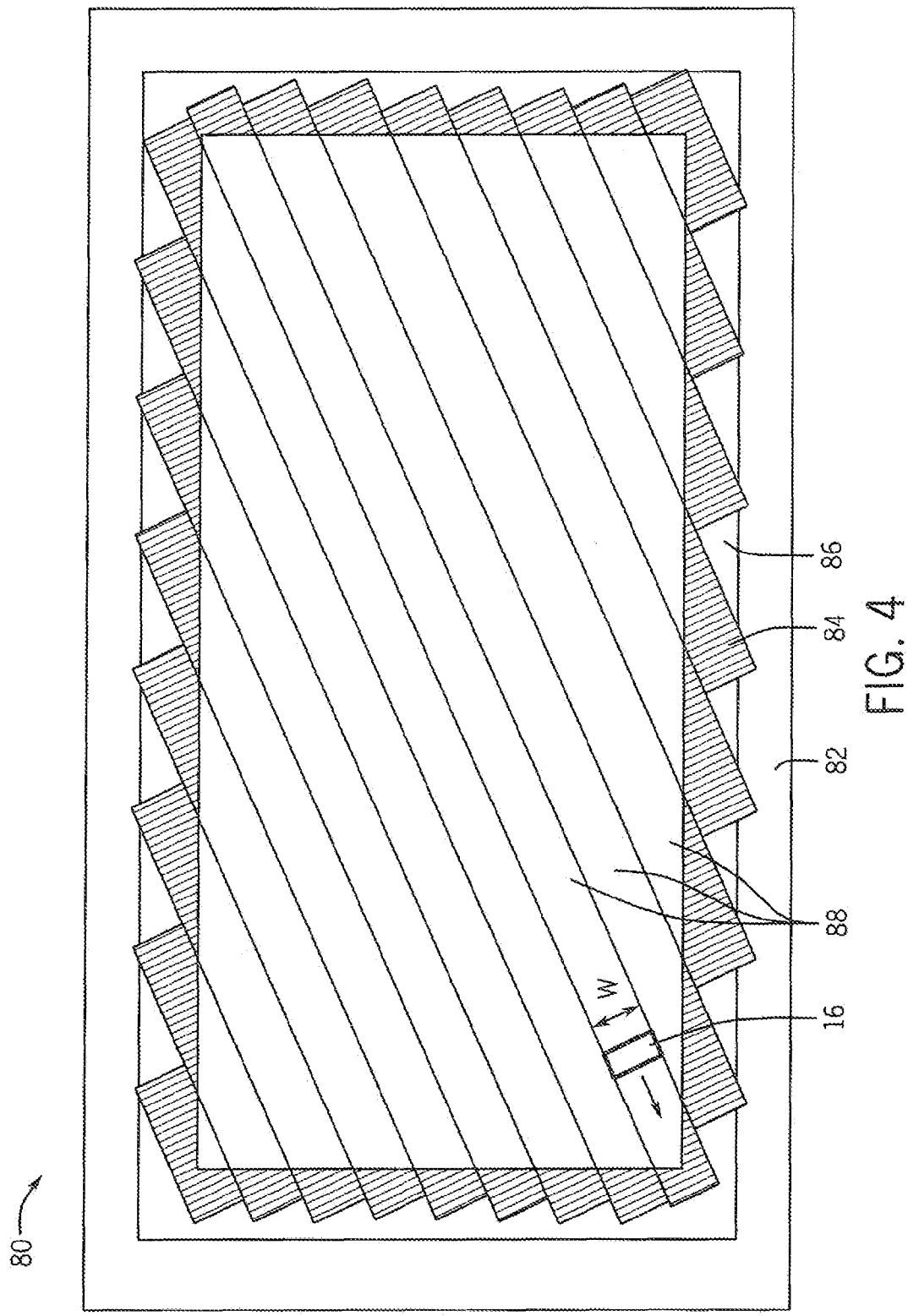

AGRICULTURAL PRODUCT APPLICATION IN OVERLAP AREAS

FIELD OF THE INVENTION

The invention relates generally to the application of agricultural products to an agricultural field, and in particular, to a method and system for applying agricultural products to an agricultural field so as to maximize the efficiency of such application.

BACKGROUND OF THE INVENTION

Farmers typically use agricultural product delivery systems for seeding large agricultural fields. Such systems often include a tractor hitched in a conventional manner to an air cart and a "drill" (an agricultural implement typically including a number of row units). In operation, the tractor pulls the air cart and the drill through a field while the air cart pneumatically delivers agricultural product(s), such as seeds, fertilizer, and the like, to the drill. The drill, in turn, applies the agricultural product(s) to seed and/or fertilize the ground.

When seeding large fields, it is desirable to maximize use of the entire area of the field in order to ensure the most efficient use of space with the greatest crop yield possible. It is also desirable to minimize the overall travel path required by the product delivery system in the field in order to ensure the most efficient use of the farmer's time and equipment. Also, minimizing the overall travel path helps to avoid disruption of already seeded ground.

However, many fields are disposed such that maximizing the entire area of the field requires at least a minimum number of redundant or overlapping travel paths. For example, oddly shaped fields, or fields with obstacles, such as trees, structures, and the like, require additional maneuvering by the product delivery system which may result in overlaps with earlier travel paths. Also, fields disposed on inclines may require travel paths at angles through the field, which may result in overlapping travel paths around the perimeter or "headlands" of the field. Such overlaps can cause double seeding, which results in heavier crops and potentially "lodging" (crops falling flat on the ground). Moreover, unnecessarily applying excess agricultural product can be costly.

What is needed is an improved technique for the application agricultural products which maximizes the entire area of a field while minimizing the drawbacks of overlapping with travel paths.

SUMMARY OF THE INVENTION

The present inventors have recognized that by varying the agricultural product application rates when a product delivery system travels through predetermined overlap areas, the drawbacks of over seeding such overlap areas may be substantially reduced. As a result, the product delivery system may travel without stopping meter sections and without dragging the seeding tool through a completely seeded region.

Accordingly, a meter rotational speed may be related to an agricultural product dispensing rate. A reduction in meter rotational speed from a first pass to a second pass may equal a desired rotational speed, and thus a desired product dispensing rate. As a result, delivery of the product may be continuous from pass to pass, and the total amount of product delivered (combined from each passes) may equal only the desired amount for the field, and not an excessive amount.

The invention includes a method of cutting back application rates, such as from 1-99%, at potential overlap areas in a field the first time around, then compensating for that cutback on the overlapping pass so that the total application in overlapped areas is never more than the desired rate, or 100%. For example, in a predetermined overlap area, the product application rate could be cut back from to 1%, and at a different time, on the overlapping pass, the product application rate could be put at 99%. Or, the product application rate could be cut back to 50%, and at a different time, on the overlapping pass, the product application rate could be put again at 50%. As a result, the product delivery system avoids stopping meter sections entirely and avoids dragging the tool through completely seeded areas.

This is preferred for seeding/planting systems providing a mechanism for varying the rate to at least each of the headers or dispensing units of an implement. Individually driven or controlled roller segments can cut back product application rates in sections of the drill while avoiding an undesirable complete shut-off.

The product delivery system may receive location data to predetermine the overlap areas. For example, the product delivery system may include a Global Positioning System (GPS) to calculate where and when to cut product application rates back to avoid double seeding.

In one aspect, the product delivery system may travel an outside path of a field while receiving location data. Accordingly, a control system of the product delivery system could calculate where the drill would overlap, including based on input from the operator, such as drill width, seeding speed, application rate, and the like. When entering overlap areas sensed by received location data for the first time (first pass), the control system could cut the product application rates of corresponding drill sections in the overlap area, such as 1% of the desired product application rate for reaching a predetermined product application amount. The operator could subsequently resume normal product applications of 100% (outside of the overlap area), but when the operator enters the overlap areas again (second pass), the product application rate could be cut back to a supplementary value, such as 99% of the desired product application rate, to achieve the target rate required by the farmer.

Specifically then, in one aspect, a method of applying an agricultural product to the ground from an agricultural implement having a plurality product dispensing units and a control system for controlling a rate of product flow through the product dispensing units is provided. The method may include controlling a rate of product flow through at least one of the product dispensing units to dispense a first product amount in an area of an agricultural field. The first product amount may be less than a predetermined product amount for the area. Then, at a different time, controlling a rate of product flow through at least one of the product dispensing units to dispense a second product amount in the area. The first and second product amounts total the predetermined product amount.

Other aspects, objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout.

FIG. 4 is a diagram of an exemplar agricultural field including predetermined overlap areas.

DETAILED DESCRIPTION OF THE DRAWINGS

Figure 1:
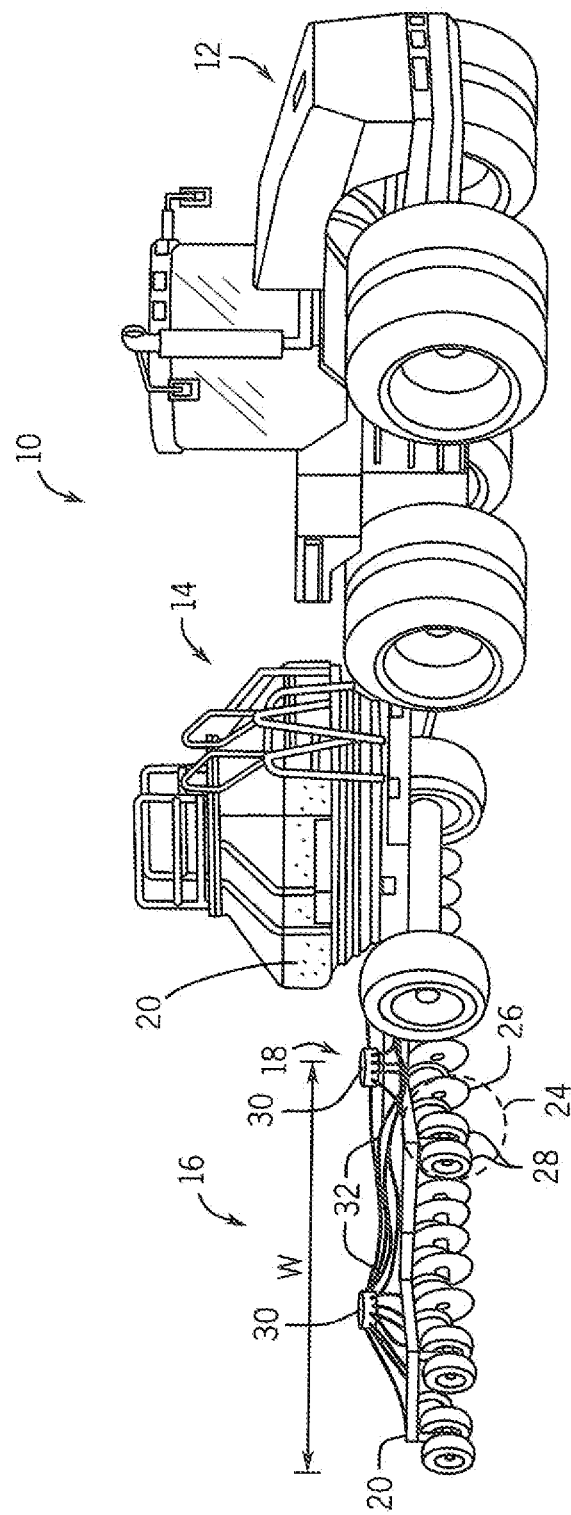
FIG. 1 is an isometric view of an exemplar agricultural product delivery system having a plurality of product dispensing units for applying an agricultural product to the ground in accordance with the present invention.

Referring now to FIG. 1, an isometric view of an exemplar agricultural product delivery system 10 is shown in accordance with the present invention. The product delivery system 10 may be used for seeding a large agricultural field and may typically include a tractor 12 hitched in a conventional manner to an air cart 14 and a drill 16 having a width "W." The air cart 14 could be, for example, a PRECISION AIR® cart, and the drill 16 could be, for example, an ATX700 air hoe drill, each available from the Case 1H company.

A pneumatic distribution system 18 may be arranged with respect to the air cart 14 and the drill 16 for pneumatically delivering an agricultural product 20, such as seeds, fertilizer, and the like, from the air cart 14 to the drill 16 for distribution to the field. The pneumatic distribution system 18 includes a fan(s), which may be a centrifugal fan, for generating an airflow(s) that is directed through the pneumatic distribution system 18 to entrain the product 20 for pneumatic delivery to the field.

The drill 16 includes a frame 22 to which a plurality of row units 24 are coupled. Each row unit 24 may include an opener 26, such as the exemplar disc-style opener as illustrated, and row finishing equipment, such as the exemplar packer or closing wheels 28 as illustrated. The opener 26 is configured to cut a furrow into the soil. One or more distribution manifolds 30 are arranged on the drill 16 and are respectively connected to distribution lines 32. The distribution manifolds 30 distribute the product 20 to individual dispensing units (shown in FIG. 2A) for each row unit 24 to dispense the product 20 into furrows created in the field. This allows the pneumatic distribution system 18 to pneumatically deliver the product 20 from the air cart 14 into a furrow cut by the opener 26. The closing wheels 28 are arranged on the drill 16 for subsequently closing the furrow.

Figure 2A:
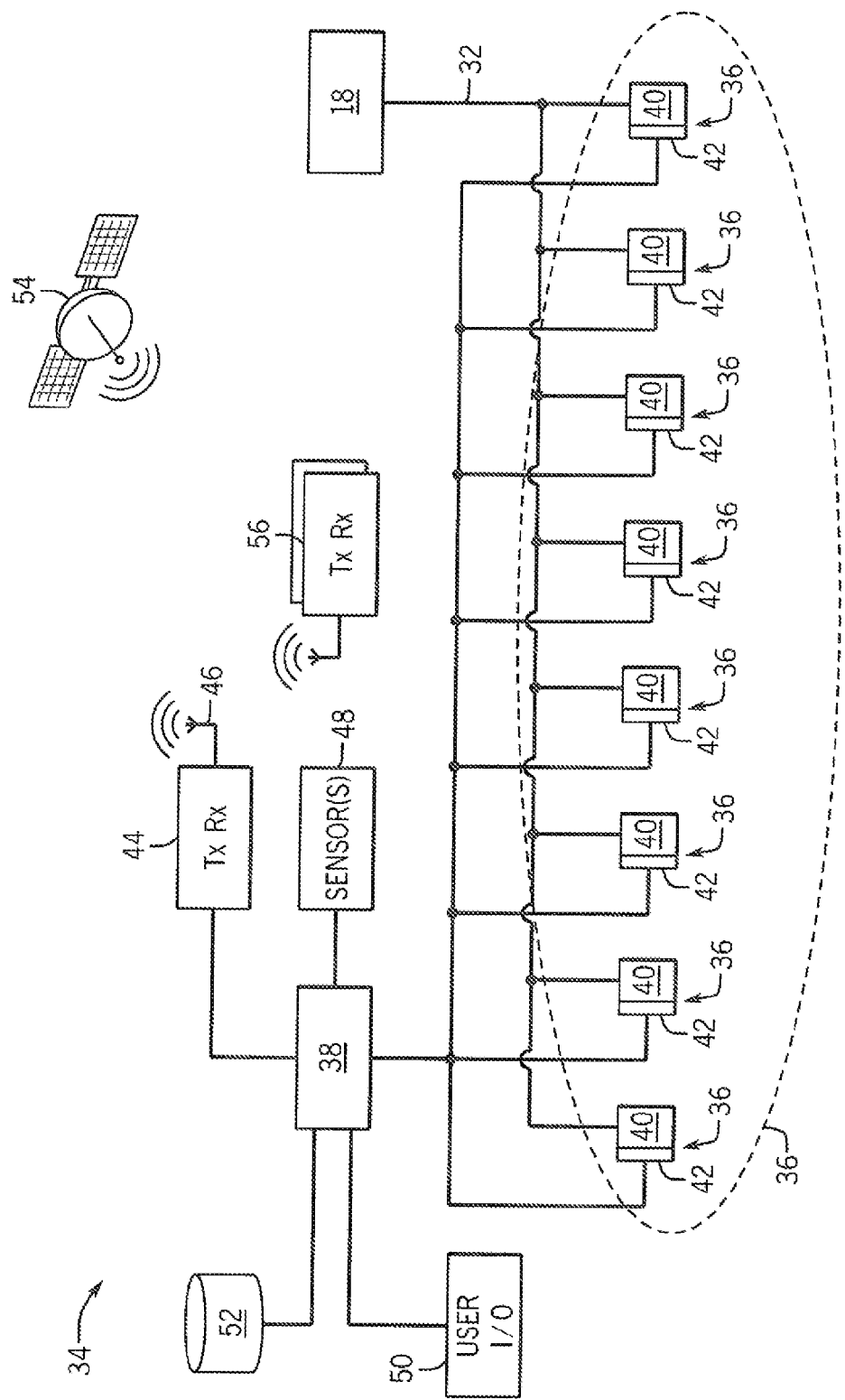
FIG. 2A is a schematic of a control system in a first aspect.

Referring now to FIG. 2A, a schematic view of a control system 34 in a first aspect for effectuating the methodology of the present invention is provided. The product delivery system 10, as illustrated in the control system 34, may include a metering/dispensing system 35 for receiving the product 20 from the air cart 14 and delivering the product 20 to the drill 16 for distribution to the ground.

The metering/dispensing system 35 may include multiple dispensing units 36, which may include, for example, a metering unit 40 that receives a portion of the product 20 from the air cart 14 via the pneumatic distribution system 18, and a prime mover 42 which drives the metering unit 40. A controller 38, e.g., a microprocessor, a microcontroller, or other programmable logic device, is operatively connected to and individually controls the dispensing units 36 via the prime movers 42 such that distribution rates of the individual metering units 40 can be varied independently of each other. The prime movers 42 may be, for example, electric motors. Other techniques for providing individually driven or controlled dispensing units 36, such as electronically controlled valves and the like, may be provided within the spirit of the invention. Accordingly, each of the dispensing units 36 may be controlled by the controller 38 to dispense the product 20 by a variable rate or amount ranging anywhere from zero (completely off) to 100% (completely on). For example, a particular dispensing unit 36 could be controlled to first dispense the product 20 at a rate of 1%, then, at a different time, a rate of 99%.

The controller 38, in turn, may be connected to a transceiver 44 and antenna 46, one or more sensors 48, a user input/output (I/O) interface 50 and a storage device 52. The transceiver 44 may allow wireless communication, via the antenna 46, between the controller 38 and another device. The transceiver 44 may receive real-time location data as part of Global Positioning System (GPS) via GPS satellites 54. The transceiver 44 may also receive real-time location data and/or other communications from a field communication system 56. The one or more sensors 48 may provide sensed information to the controller 38, including, but not limited to, a speed of the product delivery system 10.

The user I/O interface 50 provides a mechanism for displaying real-time information from the controller 38 to an operator in the cab of the tractor 12, and for receiving real-time information from the operator in the cab to the controller 38. The user I/O interface 50 may display, for example, the dispensing status of each of the dispensing units 36 and/or location data from the transceiver 44 and antenna 46, and may receive, for example, information regarding the agriculture product(s) being dispensed, the configuration of the air cart 14 and the drill 16 (including the number of dispensing units 36, the throughput of each of the dispensing units 36, the width of the product delivery system, and/or the real-time speed of the product delivery system 10).

The controller 38 may store data received from the transceiver 44, the sensors 48, the user I/O interface 50; pre-programmed data; and/or an updateable control program for controlling the dispensing units 36 in an internal memory structure and/or the storage device 52. The internal memory structure and/or the storage device 52 may be a non-volatile memory array such as Flash memory.

Figure 2B:
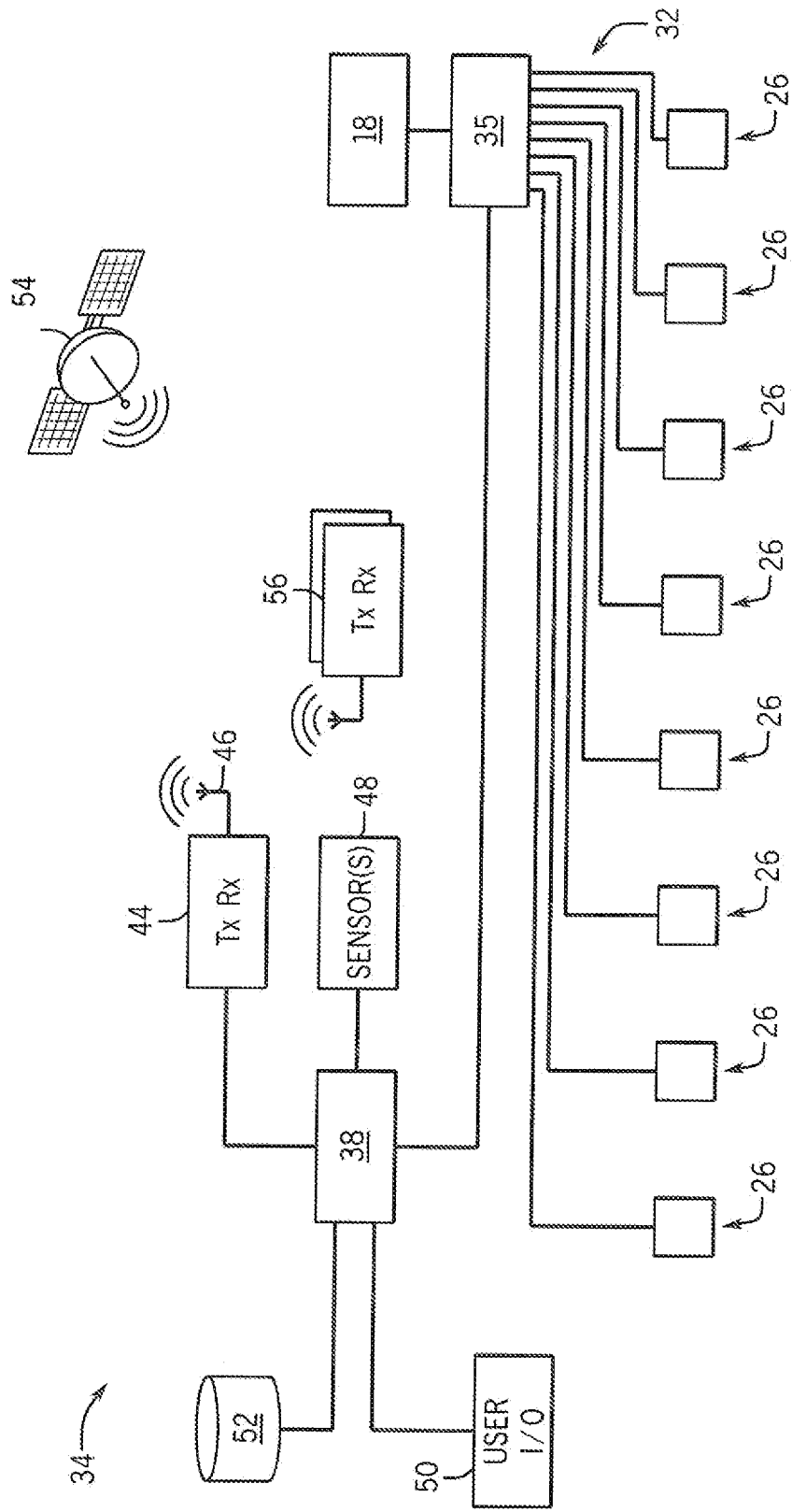
FIG. 2B is a schematic of a control system in a second aspect, each for the exemplar product delivery system of FIG. 1.

Referring now to FIG. 2B, a schematic view of a control system 34 in a second aspect for effectuating the methodology of the present invention in which like reference numerals are employed to designate corresponding parts. Here, the metering/dispensing system 35 may be disposed on the air cart 14, in proximity to the pneumatic distribution system 18. The metering/dispensing system 35 is in communication with the controller 38 to dispense the product 20 at different rates that are particular to the individual distribution lines 32. The individual distribution lines 32, in turn, lead to the opener 26 for placement in the ground. Accordingly, the metering/dispensing system 35 may be controlled by the controller 38 to dispense the product 20 by a variable rate or amount ranging anywhere from zero (completely off) to 100% (completely on) for each row unit.

Figure 3:
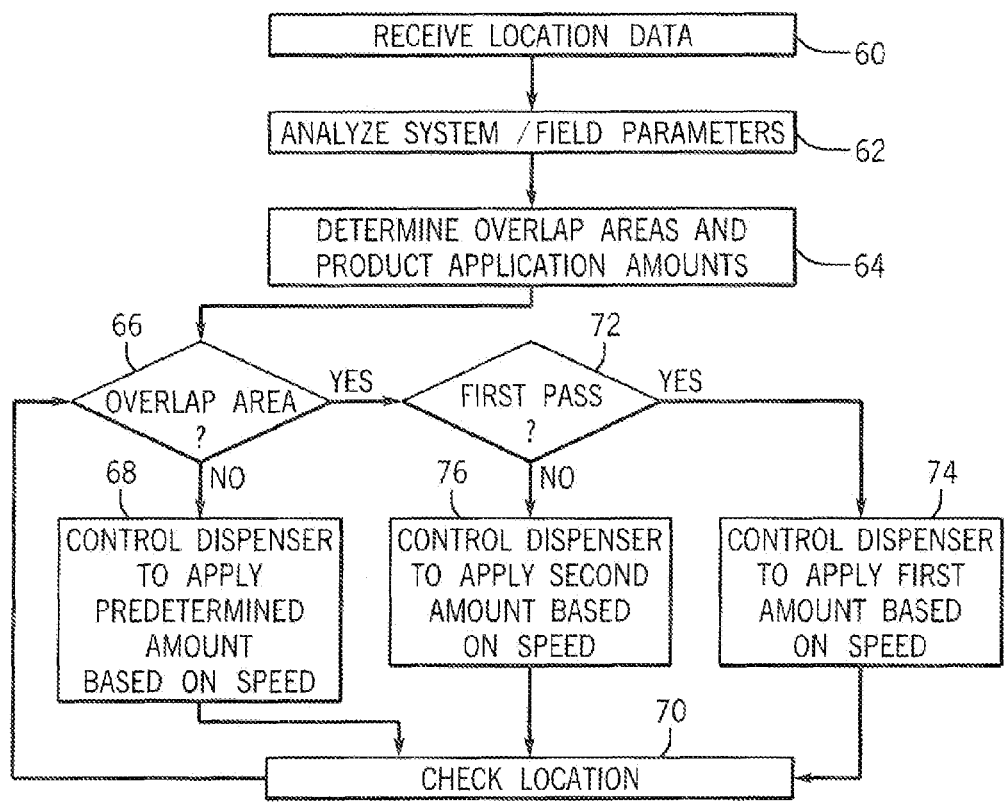
FIG. 3 is a flow chart illustrating dispensing an agricultural product to the ground using the control system of FIG. 2.

Referring now to FIG. 3, a flow chart illustrating dispensing an agricultural product to the ground using the control system of FIG. 2 is provided. Initially, in process block 60, the controller 38 receives location data, such as precise GPS coordinate data via the transceiver 44 and antenna 46. Next, in process block 62, the controller 38 analyzes system and field parameters. System parameters may include, for example, the number of dispensing units 36, the throughput of each of the dispensing units 36, the width "W" of the product delivery system, which reflects a physical dimension (such as 17 feet) of the distance across the drill 16 for covering an area of ground as the drill 16 moves forward, a desired speed, a desired angle of travel, and the like, which may be pre-programmed and/or provided by the user I/O 50. Field parameters may include a mapping of the field, which may be pre-programmed and/or determined by initially travelling along the boundaries of the field, such as around the perimeter, while receiving location data.

Next, in process block 64, based on the system and field parameters, the controller 38 may automatically calculate and determine areas in the field, with coordinate locations, in which seeding overlap is expected to occur. In doing so, the controller 38 may base such predicted overlaps on an idealized or preferred travel path which minimizes the overall travel path required and which is provided to the operator in the cab. The operator may optionally adjust the travel path via the user I/O 50, and accordingly, the controller 38 may adjust the predicted overlap areas.

Next, while seeding the field, in decision block 66, the controller determines whether any part of drill 16 is entering or in an overlap area. If the drill 16 is not in an overlap area, the process continues to process block 68 in which the controller 38 controls the rate of product flow through the dispensing units 36 to achieve a predetermined (or target) product amount for the area. The process then continues to process block 70 in which the location is checked. Then, then the process returns to decision block 66 to again determine whether any part of the drill 16 is entering or in an overlap area.

If the drill 16 is entering or in or an overlap area, the process then continues to decision block 72. In decision block 72, it is determined if this is the first pass in the particular overlap area. If it is the first pass, then the process then continues to process block 74 in which at least one of the dispensing units 36 is controlled to dispense a first product amount in the overlap area. The first product amount is less than the predetermined (or target) product amount. In other words, the controller 38 adjusts the product application rate of corresponding drill sections in the overlap area, such as to 1% of the desired amount. Each of the dispensing units 36 may be controlled individually based on its location status with respect to the overlap area.

The at least one of the dispensing units 36 may be controlled to dispense product 20 in accordance with travel speed of the system 10 and, in turn, the drill 16. As such, the metering/dispensing system 35 may adjust ahead of time (e.g., slow down or speed up) to account for lag time for the actual rate of product 20 to travel from the air cart 14 (or other product tank) to the openers 26 for placement in the ground. This lag time may vary with the travel speed and metering/dispensing rate. For example, the metering/dispensing system 35 may have to start adjusting about four seconds ahead of reaching the overlap area 84. This timing would be determined based on the travel speed, the position of the drill 16 (such as via GPS) and the distance to the mapped/projected overlap area 84.

The process then continues to process block 70 in which the location is checked. Then, then the process returns to decision block 66 to again determine whether any part of the drill 16 is entering or in an overlap area.

However, in decision block 72, if it is determined this is not the first pass in the particular overlap area, but rather a second pass at a different time, then the process continues to process block 76. In process block 76, at least one of the dispensing units 36 is controlled to dispense a second product amount in the overlap area, such that the first and second product amounts total the predetermined (or target) product amount. In other words, the controller 38 adjusts the product application rate of corresponding drill sections in the overlap area, such as to 99% of the desired amount. Again, each of the dispensing units 36 may be controlled individually based on its location status with respect to the overlap area. The process then continues to process block 70 in which the location is checked, then to decision block 66 in which it is again determined whether any part of the drill 16 is entering or in an overlap area.

Referring now to FIG. 4, a diagram of an exemplar agricultural field 80 including predetermined overlap areas is provided. The agricultural field 80 may be disposed on an incline such that travel paths at angles through the field would be desirable. Accordingly, certain overlap areas 84 may be expected around the perimeter or "headlands" of the field 80 due to the travel paths at angles reaching the perimeter of the field 80.

The drill 16 is drawn by the tractor 12 and the air cart 14 (the product delivery system 10) around the perimeter of the field 80 to complete a first seeding travel path 82. During the first seeding travel path 82, the product delivery system 10 may gather data and perform calculations as described above with respect to FIGS. 2-3. In particular, the controller 38 identifies the overlap areas 84 based on parameters of the drill 16, such as its width "W," as illustrated. Next, the product delivery system 10 may complete a second seeding travel path 86 around the perimeter of the field 80 for a first pass through the overlap areas 84. During the second seeding travel path 86, the product delivery system 10, and in turn, the drill 16, enters and exits the overlap areas 84. As dispensing units 36 of the product delivery system 10 enter each overlap area 84 (first pass), the rates of product flow through particular product dispensing units 36 are reduced to dispense only a first product amount in the overlap area 84 that is less than a predetermined (target) product amount for the field 80. For example, in the overlap area 84, the dispensing units 36 may deliver only 1% of the predetermined product application amount in the first pass. Then, as dispensing units 36 of the product delivery system 10 exit the overlap area 84, the dispensing units 36 may resume delivering 100% of the predetermined product application amount as desired for a single pass.

Upon completing the second seeding travel path 86, a plurality of third seeding travel paths 88 are completed at desired angles through the field 80. Accordingly, in the interior of the field 80, during third seeding travel paths 88, the dispensing units 36 of the product delivery system 10 deliver 100% of the predetermined product application amount as desired for a single pass. However, as the product delivery system 10 encounters an overlap area 84 from the second seeding travel path 86, such as to make a turn for the next of the third seeding travel paths 88, the rate of product flow through particular product dispensing units 36 is again reduced, but this time to dispense a second product amount in each overlap area 84 that is supplemental to the first product amount in order to achieve an overall predetermined (target) product amount in the overlap area 84. For example, in the overlap area 84, the dispensing units 36 may deliver only 99% of the predetermined product application amount in the second pass. Consequently, 1% of the predetermined product application amount delivered in the first pass, sums with 99% of the predetermined product application amount delivered in the first pass, to result in 100% of the predetermined product application amount delivered in the overlap areas 84, thereby achieving the preferred amount of seeding. The preferred amount of seeding could be determined, for example by the user on a bulk mass basis (e.g., lbs. per acre) or on a seed population basis (e.g., seeds per acre). Then, as dispensing units 36 of the product delivery system 10 exit the overlap area 84 and begin another of the third seeding travel paths 88, the dispensing units 36 may resume delivering 100% of the predetermined product application amount as desired for a single pass.

Although the best mode contemplated by the inventors of carrying out the present invention is disclosed above, practice of the above invention is not limited thereto. It will be manifest that various additions, modifications and rearrangements of the features of the present invention may be made without deviating from the spirit and the scope of the underlying inventive concept.

We claim:

1. A method of applying an agricultural product to an agricultural field with an agricultural product delivery system, the agricultural product delivery system having a product dispensing unit and a control system for controlling a rate of product flow through the product dispensing unit, the method comprising the steps:
   determining a first portion of the agricultural field wherein agricultural product will be delivered at least twice to the agricultural field and providing the first portion of the agricultural field as an overlap area;
   dispensing a predetermined product amount on a second portion of agricultural field outside of the overlap area;
   dispensing a first product amount on the overlap area of the agricultural field, the first product amount being less than the predetermined product amount; and
   dispensing a second product amount in the overlap area subsequent to the dispensing of the first product amount, a sum of the first and second product amounts being generally equal to the predetermined product amount.

2. The method of claim 1, wherein the first product amount is distributed at a minimum rate of product flow by the product dispensing unit.

3. The method of claim 1, wherein the first product amount is approximately a first half of the predetermined product amount, and the second product amount is approximately a second half of the predetermined product amount.

4. The method of claim 1, comprising the additional step of receiving location data to determine the overlap area.

5. The method of claim 4, wherein the location data is received from a Global Positioning System.

6. The method of claim 5, comprising the additional step of determining the overlap area based on a dimension of the product dispensing unit.

7. The method of claim 6, further comprising determining the first and second product amounts in response to a travel speed of the agricultural product delivery system across the agricultural field.

8. The method of claim 1, comprising the additional step of determining a location of the overlap area by traveling a perimeter of the agricultural field.

9. The method of claim 8, wherein the location of the overlap area is at least partially determined by traveling a perimeter of the agricultural field with the agricultural product delivery system.

10. An agricultural product delivery system comprising:
    a plurality of product dispensing units for applying an agricultural product to the ground; and
    a control system for controlling a rate of product flow through the product dispensing units, the control system being configured to:
    (a) determine a first portion of the ground wherein agricultural product will be applied at least twice and providing the first portion of the ground as an overlap area;
    (b) cause the plurality of product dispensing units to apply a desired product amount on a second portion of the ground outside of the overlap area;
    (c) control a rate of a first product flow through at least one of the product dispensing units to dispense a first product amount in the overlap area of the ground; and
    (d) control a rate of a second product flow through at least one of the product dispensing units to dispense a second product amount in the overlap area of the ground,
    wherein:
    the first product amount is less than a desired product amount to be dispensed on the overlap area, and
    a sum of first and second product amounts is generally equal to the desired product amount.

11. The system of claim 10, wherein the first product flow is a minimum rate of product flow for the at least one of the product dispensing units.

12. The system of claim 10, wherein the first product amount is approximately a first half of the desired product amount, and the second product amount is approximately a second half of the desired product amount.

13. The system of claim 10, wherein the control system is configured to individually control the rate of product flow through each of the product dispensing units.

14. The system of claim 10, further comprising a wireless transceiver operatively connected to the control system, the wireless transceiver transmitting location data to the control system, such that the control system determines the overlap area in response to the location data.

15. The system of claim 14, wherein the wireless transceiver is part of a Global Positioning System.

16. The system of claim 15, wherein the control system is configured to determine a location of the overlap area in response to a dimension of the product dispensing units.

17. The system of claim 16, further comprising a speed sensor operatively connected to the control system and being configured to determine a ground speed of the product delivery system, the control system adapted for receiving a signal corresponding to the ground speed from the speed sensor and determining the first and second product amounts in response to the signal.

18. The system of claim 10, wherein the first product amount is approximately 1% of the desired product amount, and the second product amount is approximately 99% of the desired product amount.

19. A method of applying an agricultural product to an agricultural field with an agricultural product delivery system, the agricultural product delivery system having a product dispensing unit and a control system for controlling a rate of product flow through the product dispensing unit, the method comprising the steps:

determining a first portion of the agricultural field wherein agricultural product will be delivered at least twice to the agricultural field and providing the first portion of the agricultural field as an overlap area;

dispensing a desired product amount on a second portion of agricultural field outside of the overlap area;

dispensing a first product amount in the overlap area of the agricultural field, the first product amount being less than the desired product amount for the overlap area; and dispensing a second product amount in the overlap area subsequent to the dispensing of the first product amount, a sum of the first and second product amounts being generally equal to the desired product amount;

wherein the first product amount is distributed at a minimum rate of product flow by the product dispensing unit.

20. The method of claim 19, comprising the additional step of receiving location data to determine the overlap area.

* * * * *